UNITED STATES PATENT OFFICE.

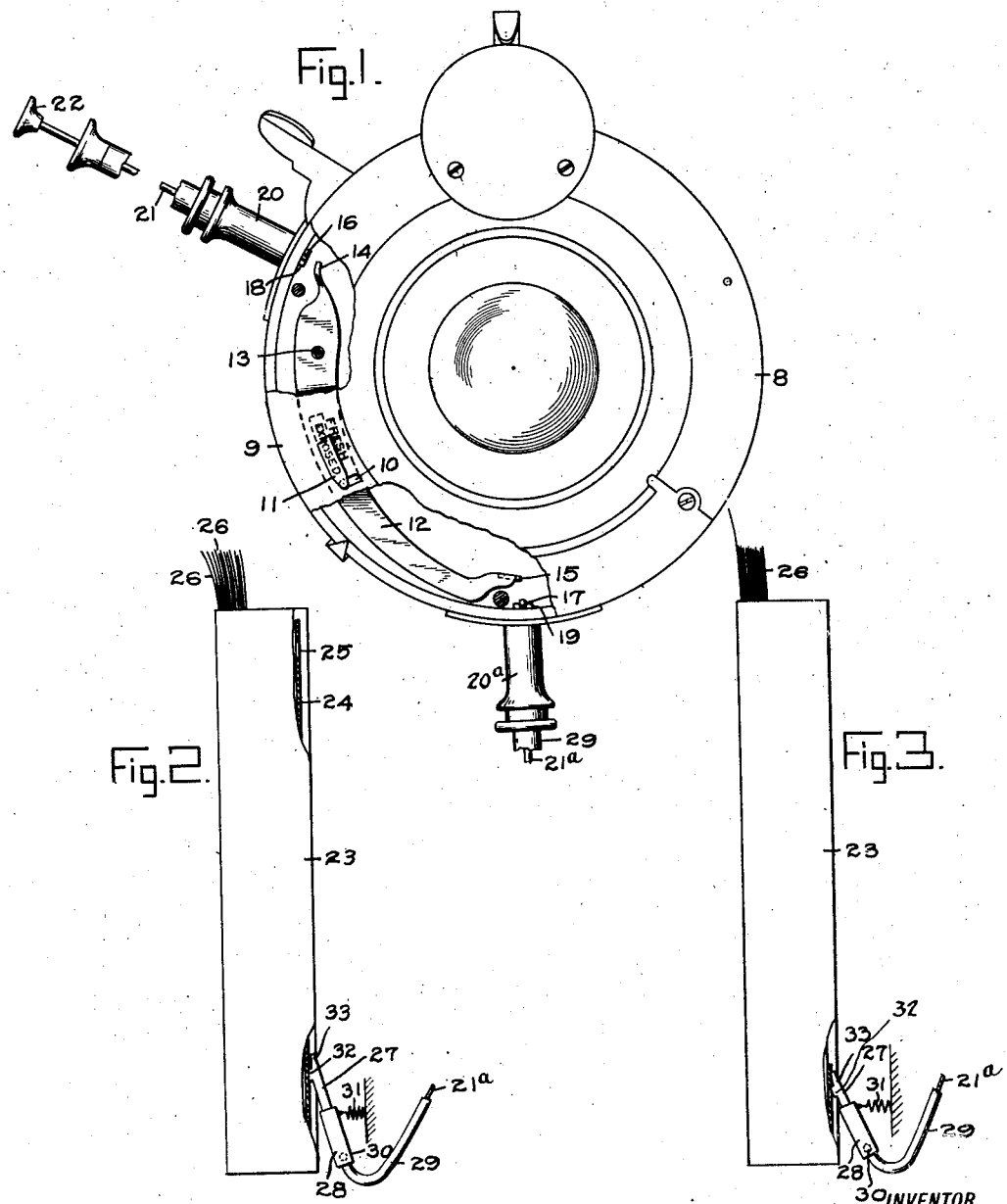

CHARLES BLIZARD BAZZONI, OF PHILADELPHIA, PENNSYLVANIA.

PHOTOGRAPHIC-CAMERA REGISTER.

1,187,235.  Specification of Letters Patent.  Patented June 13, 1916.

Application filed May 7, 1915. Serial No. 26,524.

*To all whom it may concern:*

Be it known that I, CHARLES B. BAZZONI, a citizen of the United States, and a resident of Philadelphia, in the county of Philadelphia and State of Pennsylvania, have invented a new and Improved Photographic-Camera Register, of which the following is a full, clear, and exact description.

Among the principal objects which the present invention has in view are: To provide means for notifying the user of the fact that the sensitized material which at any time is placed in the focal area, is fresh, or has been exposed; and to provide means operatively connecting a sensitized material and the register above mentioned to set the same to indicate the presence of a fresh sensitized area, said means being operable by the exposed area or medium as the same is removed from the focal area.

*Drawings.*—Figure 1 is a front view of a camera shutter, the face plate thereof being partially cut away to show the register-operating mechanism; Fig. 2 is an edge view of a film pack preferably used in conjunction with the register above mentioned, said pack and register-operating mechanism connected therewith being shown in the inactive position thereof; Fig. 3 is a similar view, showing the active position of the pack and register-operating mechanism connected therewith.

*Description.*—As seen in the drawings, a shutter 8 of conventional form and construction is provided in the cover 9 thereof with a slot 10, through which is extended the shank of a cover blade 11. The blade 11 is preferably curved concentric with the cover 9 and adapted for placement above, to conceal one or other of the words "Fresh" or "Exposed," when moved thereto. The blade 11 is supported in fixed relation upon a lever 12. The lever 12 is pivoted on a pin 13 suitably mounted in the structure of the shutter. The lever 12 has formed at one end a finger 14 and at the other end a foot 15. The finger 14 and foot 15 are disposed in the path of, to be engaged by, hooks 16 and 17, respectively, said hooks being mounted at the ends of plungers 18 and 19 respectively. The plungers 18 and 19 are moved back and forth in ferrules 20 and 20ª by flexible wires 21. One of the wires 21 is provided at the end with a push-button 22 arranged for manual manipulation.

The manipulation of the button 22 results in moving the plunger 18 to release or inaugurate the operating mechanism for the shutter 8. When the plunger 18 is moved to inaugurate the operation of the shutter 8, the hook 16 with which it is provided passes under and engages on its return, the finger 14. The immediate result of rocking the lever 12 on the pin 13 in the manner described is that the blade 11 is moved over the section of the cover 9 having the imprint "Fresh," and exposes that section of the cover having the imprint "Exposed." The hook 16 passes from or out of engagement with the finger 14 after having rocked the lever 12 to the position indicated. It is obvious that any one now using the camera will see that the sensitized member placed in the focal area of the camera has been exposed. This condition of the register will not be changed until the lever 12 is rocked to its initial position, as best shown in Fig. 1 of the drawings, which operation is the office of the plunger 19 and hook 17 carried thereby.

When using a film pack such as indicated in the drawings by the numeral 23, the sensitized sheets 24 are each provided with an aperture 25, as seen best in Fig. 2 of the drawings. Preferably the apertures 25 are placed in the sensitized sheets 24 near the upper, or what may be termed the "following" ends thereof. As usual, the sheets are each provided with a pulling tab 26 constructed preferably of paper.

Placed in the path of the apertures 25 is a blade 27 slidably mounted in a ferrule 28 at the end of a flexible cable 29. The cable 29 forms a housing for the wire 21 to which is operatively connected the plunger 19. The blade 27 is likewise operatively connected with said wire. The ferrule 28 is pivotally mounted by a pin 30 in the frame of the camera, and is normally rocked toward the pack 23 by a spring 31. The pressure of the spring 31 is sufficient to cause the projection 32 formed on the blade 27 to enter the aperture 25 of each of the sheets 24 as the same are drawn from the front to the rear of the pack. The projection 32 is engaged by the apertures 25 when the blade 27 is disposed substantially as shown in Fig. 2 of the drawings. Becoming engaged, the blade 27 is depressed to the position shown in Fig. 3 of the drawings, said blade entering the rocking ferrule 28. The projection 32 is, in effect, withdrawn from engagement with the aperture 25 by the operation of the toe 33 of the blade 27, which bears upon the sheets 24 to form a bearing for said blade to gradually withdraw the projection 32 from the apertures 25. When the projection 32 is released by each of the apertures, the retractive spring with which the wire 21 is usually provided, extends said blade 27 to the inactive position shown in Fig. 2 of the drawings.

When the blade 27 is moved in the manner described, the wire 21ª with which it is connected is similarly moved. This movement of the wire 21ª extends the plunger 19 and hook 17 connected therewith, inward, said hook passing under the foot 15 of the lever 12 to engage the same from above. When now the projection 32 on the blade 27 is released from an aperture 25, the retraction of the wire 21 draws down the plunger 19 and hook 17, moving the lever 12 to the position shown in Fig. 1 of the drawings. Prior to suspension of the movement of the plunger 19, the foot 15 passes out of the path of the hook 17, which becomes disengaged from said foot, and in turn moves out of the path thereof to permit the lever 12 free movement when engaged by the plunger 18. As seen in Fig. 1 of the drawings, the movement just described disposed the cover blade 11 above the word "Exposed", leaving the word "Fresh" visible. When the register is thus disposed, the person operating the same may see that the sensitized element in the camera is fresh, or has not been exposed.

To replace the blade 11 herein described, a window may be cut in the shutter casing, exposing appropriately marked areas of the lever 12 beneath. Other similar arrangements, not mentioned or shown herein, may be employed, having the same object in view, without departing from the spirit of the present invention.

Claims:

1. An apparatus, comprising a shutter; actuating mechanism therefor; a sensitized member; a visible index; means connecting said actuating mechanism and index for operating said index in correspondence with the operation of said actuating mechanism; means connecting said sensitized member and said index for operating said index in correspondence with the movement of said member, said means embodying an aperture formed in said member; and a transmission mechanism adapted for engagement by said aperture to be moved in correspondence with the movement of said member, said transmission mechanism embodying a member engaging said index after the index has been operated upon by said actuating mechanism.

2. An apparatus as characterized, comprising a shutter; actuating mechanism therefor; a sensitized member; a visible index; means connecting said actuating mechanism and index for operating said index in correspondence with the operation of said actuating mechanism; means connecting said sensitized member and said index for operating said index in correspondence with the movement of said member, said means embodying an aperture formed in said member; a transmission mechanism adapted for engagement by said aperture to be moved in correspondence with the movement of said member, said transmission mechanism embodying a member for engaging said index after the index has been operated upon by said actuating mechanism; and a rocking member, the ends whereof are movable for engagement by said actuating mechanism and transmission mechanism alternately, said rocking member being operatively connected with said index.

3. An apparatus, comprising a shutter; a manually-operated actuating mechanism therefor; a plurality of sensitized members, each provided with engagement means; a transmission mechanism embodying a rocking member for engagement by said means for operation thereby; a reciprocating engagement member mounted in said shutter and operatively connected with said transmission mechanism; and a rocking lever mounted in said apparatus, the opposite ends of said lever being disposed for engagement by said actuating mechanism and said engagement member alternately, said mechanism and said member operating at opposite ends of said lever to place the other end thereof in the path of the inactive mechanism or member respectively.

4. An apparatus, comprising a shutter; a manually-operated actuating mechanism therefor; a plurality of sensitized members, each provided with engagement means; a transmission mechanism embodying a rocking member adapted for engagement by said means for operation thereby; a reciprocating engagement member mounted in said shutter and operatively connected with said transmission mechanism; and a rocking lever mounted in said apparatus, the opposite ends of said lever being disposed for engagement by said actuating mechanism and said transmission mechanism alternately, each of said mechanisms, when active, operating to place the opposite end of said lever in the path of the inactive mechanism; and a movable index blade operatively connected with said rocking lever to be moved thereby to indicate successively the result of operation of said actuating and said transmission mechanisms.

In testimony whereof I have signed my name to this specification in the presence of two subscribing witnesses.

CHARLES BLIZARD BAZZONI.

Witnesses:
 ERNEST BATES,
 LEON P. THOMAS.